US009292791B2

(12) United States Patent
Lu et al.

(10) Patent No.: US 9,292,791 B2
(45) Date of Patent: *Mar. 22, 2016

(54) SYSTEMS, METHODS, AND COMPUTER PROGRAM PRODUCTS FOR EXPEDITING EXPERTISE

(71) Applicant: International Business Machines Corporation, Armonk, NY (US)

(72) Inventors: Jie Lu, Hawthorne, NY (US); Jeffrey Scott Boston, Wappingers Falls, NY (US); Anni Rosa Coden, Bronx, NY (US); Jennifer Ceil Lai, Garrison, NY (US); Shimei Pan, Armonk, NY (US); Mercan Topkara, Scarsdale, NY (US); Zhen Wen, Springfield, NJ (US); Stephen Peter Wood, Thornwood, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 714 days.

This patent is subject to a terminal disclaimer.

(21) Appl. No.: 13/659,716

(22) Filed: Oct. 24, 2012

(65) Prior Publication Data

US 2014/0101086 A1     Apr. 10, 2014

Related U.S. Application Data

(63) Continuation of application No. 13/648,988, filed on Oct. 10, 2012.

(51) Int. Cl.
*G06N 5/02*     (2006.01)
*G06Q 10/06*     (2012.01)

(52) U.S. Cl.
CPC . *G06N 5/02* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 6,807,535 B2 | 10/2004 | Goodkovsky | |
| 7,260,355 B2 | 8/2007 | L'Allier | |
| 7,844,565 B2 | 11/2010 | Sweeney | |
| 7,933,856 B2 | 4/2011 | Verspoor | |
| 2004/0205040 A1 | 10/2004 | Yoshioka | |
| 2009/0035733 A1 | 2/2009 | Meitar et al. | |
| 2011/0082825 A1* | 4/2011 | Sathish et al. | 706/46 |
| 2012/0254099 A1* | 10/2012 | Flinn et al. | 706/52 |
| 2013/0325779 A1* | 12/2013 | Shahshahani et al. | 706/46 |

OTHER PUBLICATIONS

United States Office Action dated Sep. 23, 2014 in co-pending U.S. Appl. No. 13/648,988.
United States Office Action dated May 12, 2015 in co-pending parent U.S. Appl. No. 13/648,988.

* cited by examiner

*Primary Examiner* — Kakali Chaki
*Assistant Examiner* — Kevin W Figueroa
(74) *Attorney, Agent, or Firm* — Anne V. Dougherty, Esq.; McGinn IP Law Group, PLLC (57) ABSTRACT

A system including a global topic model building module that builds a global topic model based on a set of data that is updated according to an activity of each user of a plurality of users, a user model building module that builds a plurality of user models, each user model being built based on an activity of a respective user, an expertise model building module that builds an expertise model for the topic based on the activity of at least one user of the plurality of users, the expertise model for the topic setting a target level of knowledge for a first user of the plurality of users, a processor to compare a user model of the first user with the expertise model for the topic; and an expertise assessment and learning recommendation module that recommends an activity associated with the set of data to the first user based on the comparison.

15 Claims, 8 Drawing Sheets

FIG. 1

Topic 205A

Activity-based vector of a user

| Read paper | Write paper | Read wiki | Write wiki | Read blog | Write blog | ... |
|---|---|---|---|---|---|---|
| 2.75 | 0 | 1.80 | 0 | 3.60 | 0 | ... |

Activity-based vector of the collective experts

| Read paper | Write paper | Read wiki | Write wiki | Read blog | Write blog | ... |
|---|---|---|---|---|---|---|
| 125.11 | 65.87 | 36.54 | 26.21 | 57.89 | 46.48 | ... |

Topic 205B

Activity-based vector of a user

| Read paper | Write paper | Read wiki | Write wiki | Read blog | Write blog | ... |
|---|---|---|---|---|---|---|
| 85.68 | 25.27 | 22.42 | 15.96 | 47.24 | 39.35 | ... |

Activity-based vector of the collective experts

| Read paper | Write paper | Read wiki | Write wiki | Read blog | Write blog | ... |
|---|---|---|---|---|---|---|
| 103.20 | 38.91 | 37.45 | 24.78 | 50.63 | 48.37 | ... |

SYSTEMS, METHODS, AND COMPUTER PROGRAM PRODUCTS FOR EXPEDITING EXPERTISE

CROSS REFERENCE TO RELATED APPLICATION

The present application is a continuation Application of U.S. application Ser. No. 13/648,988, filed on Oct. 10, 2012, the entire contents of which are incorporated herein by reference.

BACKGROUND OF THE INVENTION

1. Field of the Invention

The present invention generally relates to systems, methods, and computer program products for expediting a level of expertise of a topic, and more particularly to expediting a level of expertise of a topic based on the activity of a plurality of users as that activity relates to content.

2. Description of the Related Art

Corporations have a constant need for increasing the expertise of their employees in an efficient manner in order to improve enterprise productivity and profitability. The learning needed to increase expertise can be either formal (e.g., structured classroom or online courses) or informal (e.g., self-directed learning activities such as reading articles). On the one hand, there is a long and rich tradition of providing formal training solutions, but they are largely inflexible and require the learners to follow a fixed curriculum path, which is difficult if not impossible to customize to suit the needs and interests of any particular individual.

On the other hand, despite some conventional attempts at providing a solution to this problem, few focus on providing structured support to the informal learning that takes place naturally as part of everyday business. When it comes to informal learning, the burden is placed on individual learners as individual learners must still select suitable learning materials from the vast amount of available content, thereby resulting in an extremely difficult task that often results in the learners giving up before they reach their target level of expertise. Moreover, those learners who do not give up are given no feedback regarding a comparison between their current expertise level and their target level of expertise. As a result, learners are often left questioning their progress (if any), thereby resulting in even further burnout.

Furthermore, individual learners may not know who the domain experts are and hence may resort to asking questions to any number of individuals. As a result, it is possible that the individual learner will receive responses from those who may not be recognized as an expert in a field relevant to the individual learner's question. In such a case, the individual learner can become further confused by inaccurate responses to their questions.

Therefore, there is a need for learning systems, methods and computer program products that are customizable, flexible, able to provide feedback regarding a comparison between an expertise of an individual learner and that of their target level of expertise, and able to detect potential experts for a set of users.

SUMMARY OF THE INVENTION

In view of the foregoing and other exemplary problems, drawbacks, and disadvantages of the conventional methods and structures, an exemplary feature of the present invention is to provide learning systems, methods and computer program products that are customizable, able to provide feedback regarding a comparison between an expertise of an individual learner and that of their target level of expertise, and able to detect potential experts for a set of users.

A first aspect of the present disclosure allows for an expedited increase on a number of expert users within an enterprise. Activities of users who are wishing to become experts in a topic may be analyzed and a recommendation of activities may be proposed based on the activities of experts for that topic, thereby expediting a user's ability to engage in the same activities of an expert. As a result, when compared to conventional technologies, this aspect of the present disclosure allows for a faster acceleration of expertise within an enterprise.

A second exemplary aspect of the present disclosure allows user who are emerging experts to be ascertained based on their activities. Similarly, emerging topics to be ascertained and, as a result, a user or an enterprise can to respond more quickly to changing market needs.

A third exemplary aspect of the present disclosure facilitates expertise ramp-up through the use of user modeling and expertise modeling. The content and activities associated with a given user is analyzed and updated based on available information from various sources (e.g. employee learning tools, online social business tools, paper and patent databases, organizational structure, and other information repositories) to create a user model of topics in which this user is well versed. Further, the expertise model for a given topic may be created by aggregating individual user models of identified experts on given topic. A user's distance and path to the target level of expertise for a given topic are determined by comparing the model of the user for the topic and the expertise model for the topic. Both the user models and the expertise models are may be updated by incorporating new content and user activities, thereby allowing the dynamic evaluation and monitoring of the expertise levels of specific individual users, as well as, the aggregate of all contributors including the experts.

A fourth exemplary aspect of the present disclosure includes using unstructured data/content created in an organic way (e.g., through the activities and the content associated with those activities of both experts and non-experts) to create topic, user, and expertise models. These models can by created, for example, by using an automatic mining/clustering algorithm to process activities and associated content. According to at least this exemplary aspect, the present disclosure can support applications for an aggregate population (e.g., identify gaps in an enterprise) in addition to individual users, etc. to provide better support for informal learning in a social environment.

Another exemplary aspect of the present disclosure includes a system including a global topic model building module that builds a global topic model based on a set of data that is updated according to an activity of each user of a plurality of users, the global topic model including a topic representation for a topic; a user model building module that builds a plurality of user models, each user model being built based on an activity of a respective user; an expertise model building module that builds an expertise model for the topic based on the activity of at least one user of the plurality of users, the expertise model for the topic setting a target level of knowledge for a first user of the plurality of users; a processor that executes instructions to compare a user model of the first user with the expertise model for the topic; and an expertise assessment and learning recommendation module that recommends an activity associated with the set of data to the first user based on the comparison.

Another exemplary aspect of the present disclosure includes a system including an expertise model building module that estimates a target level of knowledge for a topic based on source data and an activity of a first entity relating to the source data; a user model building module that estimates a present level of knowledge of the topic for a second entity based on the source data and an activity of the second entity relating to the source data; and a processor that determines whether a gap exists between the present level of knowledge of the second entity and the target level of knowledge by executing instructions to compare the activity of the first entity and the activity of the second entity.

Another exemplary aspect of the present disclosure includes a system including a processor that executes instructions to determine a relationship between a first entity and content relating to a first topic and a relationship between a second entity and the content relating to the first topic; and an expertise assessment and learning recommendation module that recommends certain content relating to the first topic to the second entity based on the relationship between the first entity and the content relating to the first topic and the relationship between the second entity and the content relation to the first topic.

Another exemplary aspect of the present disclosure includes a computer program product for recommending an activity to a learning user having a level of expertise of a topic that is less than a target level of expertise of the topic, the computer program product comprising a computer readable storage medium having computer readable program code embodied therewith. The computer readable program code includes computer readable program code configured to determine, whether each user of a plurality of users has engaged in an activity relating to any content associated with a topic and, if a user has engaged in the activity, to determine which content the activity is associated with; computer readable program code configured to determine the target level of expertise based on the activity of one or more users having been identified as having a level of expertise of the topic that is greater than or equal to a certain level of expertise of the topic; and computer readable program code configured to recommend certain content associated with the topic to the learning user based on a comparison of the activity of the learning user and the activity of the one or more users having been identified as having the level of expertise of the topic that is greater than or equal to the certain level of expertise.

Another exemplary aspect of the present disclosure includes a method including generating a global topic model based on a set of data that is updated according to an activity of each user of a plurality of users, the global topic model including a topic representation for a topic; generating a plurality of user models, each user model being generated based on the activity of a respective user; generating an expertise model for the topic based on the activity of at least one user of the plurality of users, the expertise model for the topic setting a target level of knowledge for a first user of the plurality of users; comparing a user model of the first user with the expertise model for the topic, the comparing being performed by a processor of a computer system; and recommending an activity associated with the set of data to the first user based on the comparison.

Another exemplary aspect of the present disclosure includes a method including estimating a target level of knowledge for a topic based on source data and an activity of a first entity relating to the source data; estimating a present level of knowledge of the topic for a second entity based on the source data and an activity of the second entity relating to the source data; comparing the activity of the first entity with the activity of the second entity; and determining whether a gap exists between the present level of knowledge of the second entity and the target level of knowledge, based on the comparison of the activity of the first entity and the activity of the second entity, the determining being performed by a processor of a computer system.

Another exemplary aspect of the present disclosure includes a method including determining a relationship between a first entity and content relating to a first topic and a relationship between a second entity and the content relating to the first topic; and recommending certain content relating to the first topic to the second entity based on the relationship between the first entity and the content relating to the first topic and the relationship between the second entity and the content relation to the first topic, the recommending being performed by a processor of a computer system.

Another exemplary aspect of the present disclosure includes a computer program product for recommending an activity to a learning user having a level of expertise of a topic that is less than a target level of expertise of the topic. The computer program product includes a computer readable storage medium tangibly embodying first program instructions to determine, whether each user of a plurality of users has engaged in an activity relating to any content associated with a topic and, if a user has engaged in the activity, to determine which content the activity is associated with; second program instructions to determine the target level of expertise based on the activity of one or more users having been identified as having a level of expertise of the topic that is greater than or equal to a certain level of expertise of the topic; and third program instructions to recommend certain content associated with the topic to the learning user based on a comparison of the activity of the learning user and the activity of the one or more users having been identified as having the level of expertise of the topic that is greater than or equal to the certain level of expertise.

Additional features and benefits will be readily apparent from the following descriptions.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 1-7, there are shown exemplary embodiments of the systems, methods, and computer program products according to the present disclosure.

The present disclosure includes systems, methods and computer program products, which facilitate expediting expertise and provide support for a plurality of learning types including, for example, dynamic, exploratory, and informal learning through the use of topic, user and expertise modeling.

In some exemplary embodiments, a global topic model including derived topics is created based on the aggregation of available content (also referred to herein as "source data") from various sources. The content may include, but is not limited to, metadata and unstructured text. For example, if the source data includes a paper, then the content can include metadata such as, for example, the date of the paper, the author of the paper, associated user activities, tags, comments, etc. and unstructured text such as, for example, text from the title and body of the paper. If, for example, the source data includes a media file, then the unstructured text may include a transcription of the media file. The unstructured text may be used in order to associate certain content with one or more certain topics.

The content and activities associated with a given user is analyzed in order to create a topic-based model (also referred to herein as a "user model") of the user. The user model may represent the knowledge of the user, which relates to each of a plurality of topics.

An expertise model for a given topic of the plurality of topics may be created by aggregating individual user models of identified experts for the given topic. Experts may be identified manually or by some existing expertise identification system.

The difference between a value representing the level of expertise of a user and value representing a target level of expertise of the user for a given topic is determined by comparing the user model of the user against the expertise model for the topic. Based on this difference, activities can be recommended to the user in order to reduce the difference.

By knowing the difference between their level of expertise and their target level of expertise, this feature may help users determine their progress in getting to their target level of expertise. Further the recommended activities facilitate the users in getting closer to their target level of expertise, based on dynamic recommendations thereby supporting personalized exploratory learning.

In some exemplary embodiments, the expertise score of a user on a topic is made visible to others. This feature of the present invention serves to motivate users (e.g., enterprise users) to make more of their content visible to the system thereby increasing their automatically calculated expertise score. For example, as is detailed herein, an expertise score may be calculated based on a user's public content and activities. If this score is made visible to others, then a user may be motivated to participate in more public activities (e.g., sharing content) to increase their score. Further, if, for example, a user sees they have a relatively low expertise score for a topic which the user believes they have relatively high expertise (e.g., user is shown having an expertise score that is lower than when the user perceives their expertise to be), then the user may also be motivated to participate in more activities (e.g. sharing content) in order to attempt to increase their score. In some exemplary embodiments, the user models and the expertise models are updated regularly, in other exemplary embodiments they are constantly updated, in still other exemplary embodiments they are updated based on a user input. This updating can incorporate new content and user activities, which allows for dynamic evaluation and monitoring of the change (if any) in the expertise levels of specific individual users, as well as, the aggregate of all contributors including the experts.

The present inventors have recognized that this approach can also be applied to aggregated populations, such as, users in a department of an enterprise. For example, management or HR professionals can dynamically evaluate and monitor a gap between the current and expected expertise levels within the department for specific topics.

Figure 1:
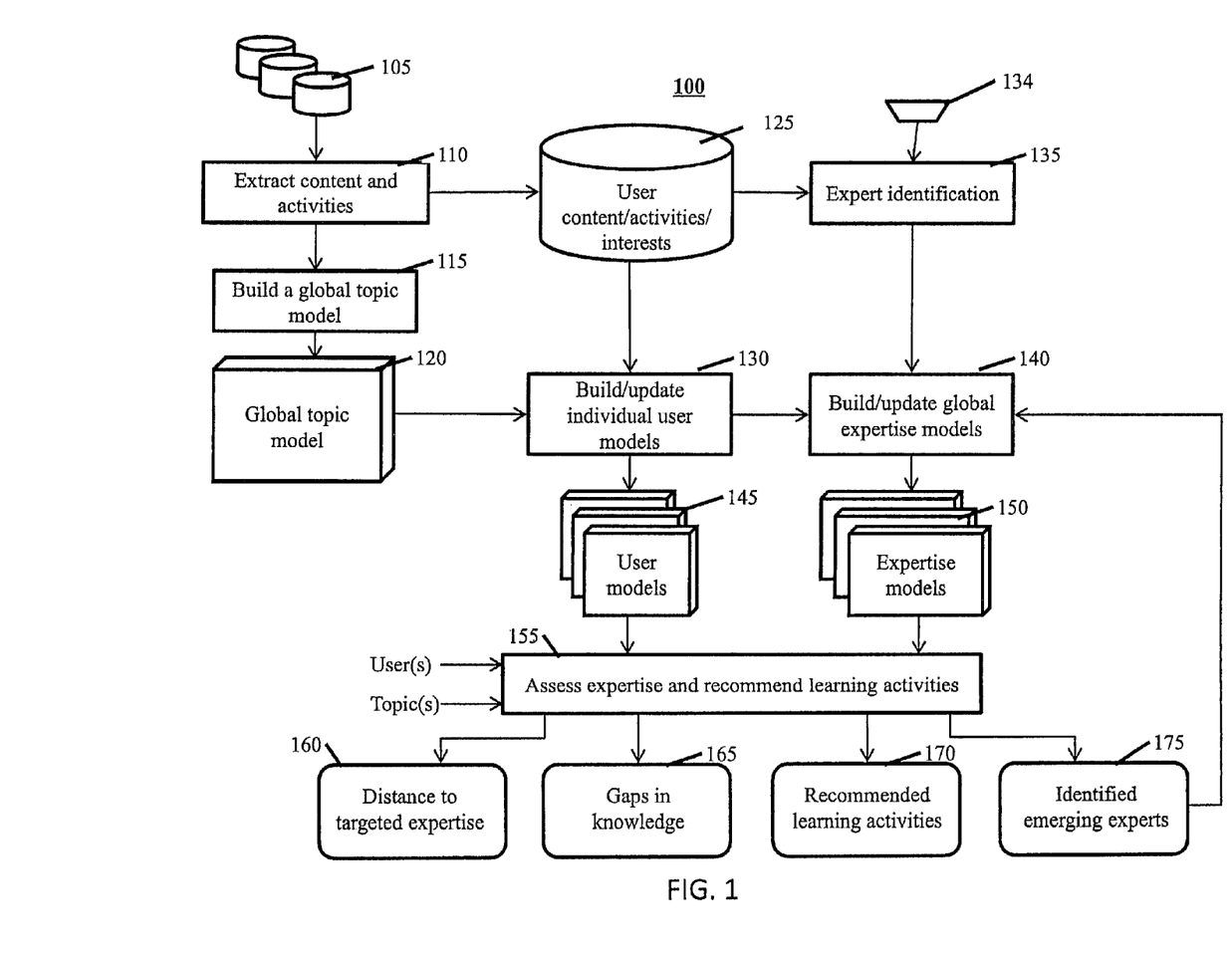
FIG. 1 depicts an exemplary system block diagram of exemplary embodiments of the present disclosure.

FIG. 1 depicts an exemplary system block diagram of exemplary embodiments of the present disclosure. A database 105 stores the source data. This source data may include any available content, such as, for example, articles, blogs, books, journals, documents, records, audio files, video files, websites, presentations, presentation materials, training material, e-mail messages, unstructured text, etc.

The source data may also include metadata. The metadata is associated with the respective content. The metadata may include information such as, how the metadata is related to the content, how often the content is accessed, who accesses the content, the amount of time that the content was accessed, the author of the article, a set of keywords describing the article or its subject, the number of unique users who have accessed the content, citations to the content, comments associated with the content, etc.

The source data may be from one or more sources. For example, the sources may include employee learning tools, online social business tools, databases, other information repositories, etc. The sources may be from within a particular enterprise, from outside a particular enterprise, or a combination thereof. The source data provided by users may be made available to others or made public, which is beneficial for at least the aforementioned motivational reasons set forth above.

An extracting module 110 extracts information from the source data and may be integrated into the system as software, a circuit, or a combination thereof. The information extracted by the extracting module 110 may include, for example, text and metadata. The extracting module 110 may also extract information relating to a user's activities associated with the content (e.g., whether the user read content, wrote content, commented on content, cited to content, etc.) from the various sources gathered within database 105.

For example, if a first user writes an article and a second user reads and comments on the article, then the extracting module 110 can extract the text and metadata from the article and determine that the first user wrote the article and that the second user read and commented on the article. That is, the extracting module 110, can associate structured data, as well as unstructured data having been processed in order to determine certain information that indicates that one or more activities (e.g., that first user wrote article and that second user read and commented on article) of a user is associated with the content.

A global topic model building module 115 creates a global topic model 120. The global topic model building module 115 may be integrated into the system as software, as a circuit, or as a combination thereof. The global topic model 120 may be created based on the content extracted by the extracting module 110. In some exemplary embodiments, the global topic model 120 may be created based the content and associated user activities extracted by the extracting module 110.

Since the source data may include unstructured information, the global topic model building module 115 may process the unstructured information according to any known method of interpreting unstructured information. For example, the global topic model building module 115 may perform any known method for data mining or text analytics in order to categorize the information.

In some exemplary embodiments, the global topic model building module 115 performs either one or both of unsupervised and semi-supervised text analytics over the source data. In some exemplary embodiments, the global topic model module 115 performs these text analytics automatically.

In other exemplary embodiments, the global topic model module 115 performs these text analytics with no human feedback/annotation or with minimal feedback, such as, for example, an input for parameter values such as the number of clusters to generate. As will be appreciated by those having skill in the art, there various algorithms that perform text analytics and the present invention is not limited to any specific algorithm.

However, solely by way of non-limiting example, the global topic model building module 115, in some exemplary embodiments, uses the Latent Dirichlet Allocation algorithm (LDA) to automatically estimate two topic-related probability distributions: topic-specific word distribution which describes the probability of a word given a topic, and document-specific topic distribution which describes the probability of a topic given a document's content. The input to this algorithm may be, for example, a set of documents and the number of topic clusters to create.

Figure 2A:
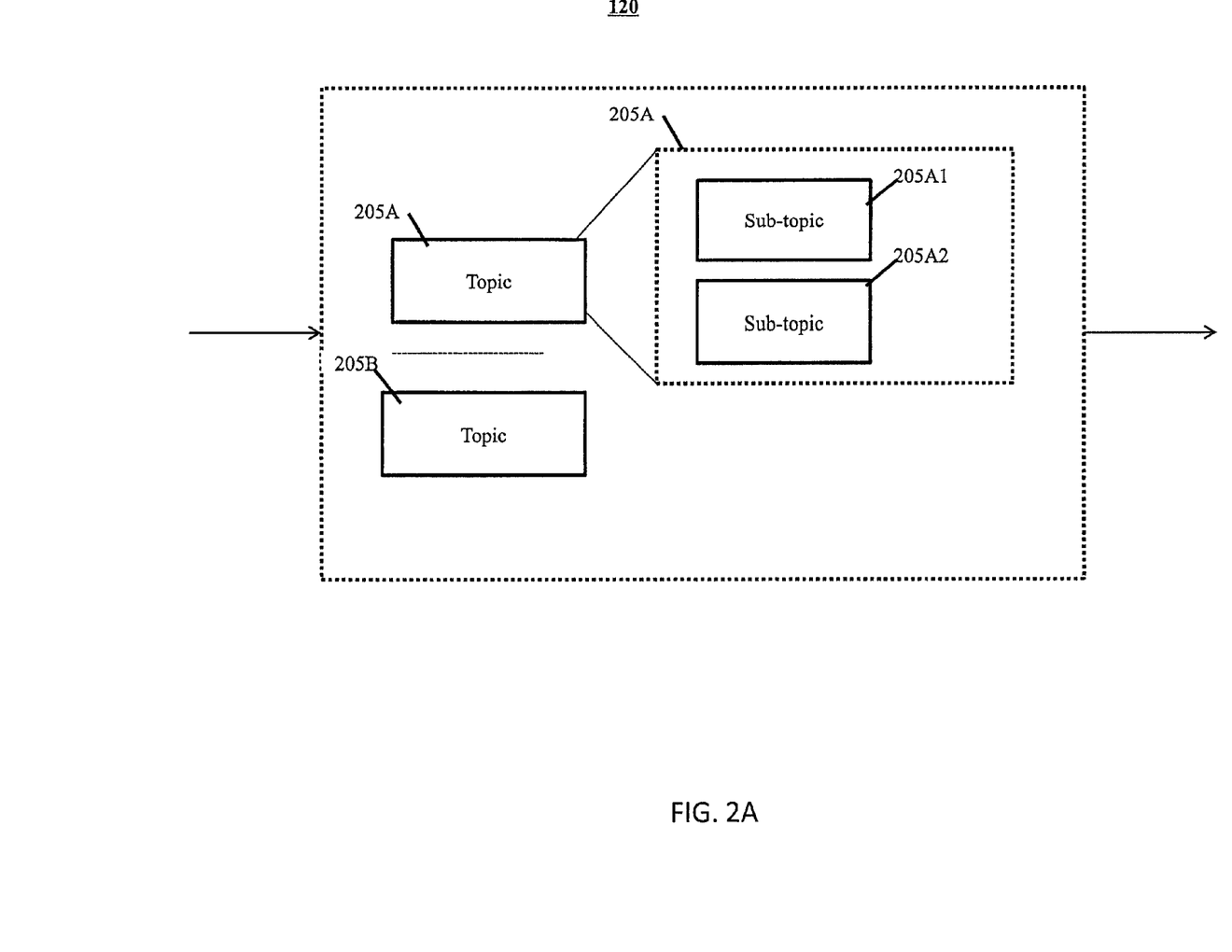
FIG. 2A depicts an exemplary embodiment of the global topic model shown in FIG. 1.

FIG. 2A shows an exemplary embodiment where the global topic model 120 includes a plurality of different topics 205A and 205B. These topics may also be referred to herein as "topic representations of a topic" or some variation thereof. Each of the topics may contain a plurality of sub-topics (e.g., 205A1 and 205A2 of topic 205A). The number of topics and sub-topics included therein, as shown in FIG. 2A, is arbitrary and more or less topics and sub-topics included therein may be included.

The global topic model building module 115 determines the topics and the sub-topics through topic modeling. A topic may include words that frequently occur together. For example, each topic may be represented using a set of keywords having certain weights. The sub-topics may each be represented using a sub-set of the set of keywords of the respective topic.

By way of example, if the source data includes an article, then the global topic model building module 115 would associate a bag-of-words of the article with the keywords of a topic and determine a topic-specific weight for the article. If the weight is greater than or equal to a predetermined threshold, then the global topic model building module 115 would associate the article with the topic. The global topic model building module 115 performs a similar scheme to associate the article with a sub-topic within the associated topic.

For example, a topic 205A of "social software" can be made up of sub-topics including analytics 205A1, visualization and software 205A2, etc. Therefore, when searching for the difference in a value representing a level of expertise of a given user and a value representing a level of expertise of experts of a particular topic, the difference can be calculated by sub-topic, and even by an item within a sub-topic (e.g., the difference between a user level of expertise and a bag-of-words in a paper within a sub-topic can be calculated).

Referring back to FIG. 1, a storing module 125 stores information regarding a user's activities as it relates to content of the source data. The storing module 125 also stores information about the topics for which each user has selected to increase expertise. The storing module 125 may be integrated into the system as software, as a circuit, or as a combination thereof.

The information stored by the storing module 125 may include metadata associated with the content extracted by the extracting module. For example, if a first user writes an article and a second user reads and cites the article, then the storing module 125 would store information indicating that the first user wrote the article and that the second user read and cited the article.

In some exemplary embodiments, the storing module 125 tracks activity (e.g., the informal learning) that a user undertakes. For example, if a user reads a web page, then a user can mark the web page as something that should be included as an activity of the user when the user model 145 of the user is updated.

In some exemplary embodiments, the storing module 125 tracks emerging hot topics (e.g., topics, for which, a predetermined number of users have selected to increase their expertise) based on an aggregate view of the topics for which the users select to increase their expertise. Therefore, emerging hot topics can be ascertained and, as a result, a user or an enterprise can to respond more quickly to changing market needs.

A user model building module 130 creates and updates a user model 145 for each user based on information from the storing module 125 and the global topic model 120. That is, for each user, the user model building module 130 creates a user model 145 using the content and activities associated with the user. The user building module 125 also uses the global topic model 120 to determine the topics of the content and activities associated with the user. The user model 145 of a user is updated based on refinements to the global topic model 120 and additional content as it becomes available and logged activities associated with the user.

A user model 145 estimates one user's knowledge of a topic of the global topic model 120 based on the user's activity associated with content related to that topic. For example, if, for a relevant topic, a user reads an article, writes an article, posts a blog, comments on any of the aforementioned content, etc., then the user model building module 130 will update the user model 145 of the user to be indicative of such activity for that topic.

That is, based on the content and activity of a user relevant to a particular topic, the system assumes that the user has some level of knowledge of that topic. The user model 145 provides an estimate of what the user knows about each topic of the global topic model 120 based on their activity.

In some exemplary embodiments, the type of the user's activity/content of a topic factors into the estimated knowledge of the user of that topic. For example, the user model 145 of a user that authors a paper on a topic may indicate that the user has greater knowledge of the topic when compared with a user model 145 a user that has only read the article. Similarly, if the article is cited frequently, then the user model 145 of the user that authored the article will indicate that the user is more knowledgeable about the topic, than if the article is cited infrequently.

The expert identification module 135 identifies experts associated with various topics. The expert identification module 135 may be integrated into the system as software, as a circuit, or as a combination thereof. For each topic of the global topic model 120, the expert identification module 135 determines whether one or more users are experts of that topic.

In some exemplary embodiments, users who have engaged in a predetermined number of activities with content of a particular topic are dynamically identified as experts on that topic. In other exemplary embodiments, experts on a topic are deter mined by a weight of each activity (e.g., authored papers, papers cited, papers read, comments, whether the comments are positive or negative, peer-reviews, whether the peer-reviews are positive or negative, etc.). Based on the weight of each activity, the users may be ranked relative to one another. Users having a rank higher than a predetermined threshold are identified as experts. Users identified as experts may be ranked relative to one another.

There is a possibility that a user having been dynamically identified as an expert may not actually be an expert. Therefore, in some exemplary embodiments, the expert identification module 135 may receive a manual input 134 to reclassify a user having been classified as an expert as a non-expert. Similarly, some users who are regarded as experts may not be dynamically identified as such. Accordingly, the expert identification module may receive a manual input 134 to reclassify a user having been classified as a non-expert as an expert. These features may be beneficial because some users may mistrust a dynamic rank without manual feedback. By allowing users to be manually identified as expert or non-expert, this issue can be resolved.

For each topic model (e.g., 205A and 205B) of the global topic model 120, the user model(s) of the expert(s) for the respective topic are aggregated to create an expertise model 150 for that topic.

Specifically, the expertise model building module 140 aggregates the user models 145 of the experts identified for the given topic in order to create the expertise model 150 for that topic.

In some exemplary embodiments, each of the user models 145 include, for each topic, an activity-based vector that is based on the activities and content associated with the user.

The activity-based vector represents an estimate of the level of expertise of a user for a respective topic. Each activity is weighted by the activity type (e.g. whether the user read the content, wrote the content, downloaded the content, etc.) and the relevance to the topic, popularity, and importance of the associated content. The dimensions of the activity-based vector may be activity types, and the value of each dimension may be the sum of the weights of all activities of the associated type.

Figure 2B:
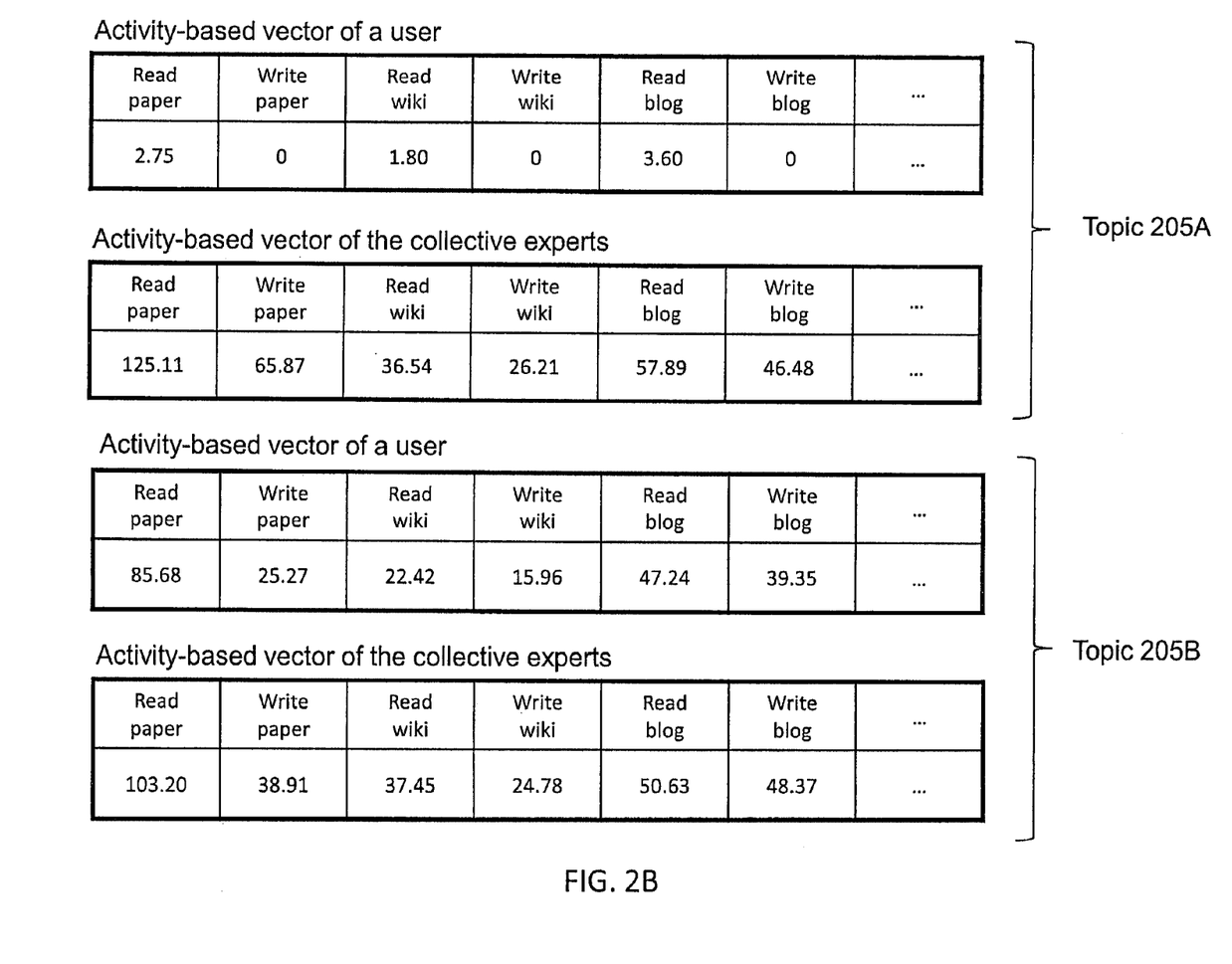
FIG. 2B depicts exemplary activity-based vectors of a user and exemplary activity-based vectors of expertise models.

FIG. 2B shows a user's activity-based vector vs. the aggregate activity-based vector of the collective experts for exemplary topics 205A and 205B, respectively. In this example, the user does not have a lot of activities related to topic 205A. For ease of understanding, it is assumed that an arbitrary predetermined threshold is set. It is further assumed that the distance between the user's activity-based vector and the experts' activity-based vector is greater than the predetermined threshold. Accordingly, the distance between the activity-based vector of the user and the experts' activity-based vector indicates that there is a gap in the knowledge of the user for topic 205A.

In contrast, it is assumed that the distance between the user's activity-based vector and the experts' activity-based vector is less than the predetermined threshold for topic 205B. Accordingly, the distance between the user's activity-based vector and the experts' activity-based vector indicates that there is not a gap in the knowledge of the user for topic 205B. It should be noted that the predetermined threshold can be set for the global topic model 120 as a whole (e.g., a universal threshold), as well as individually for the topic representation for each topic. It should also be noted that a user's activity-based vector can be compared with the aggregate activity-based vector of the collective experts for each sub-topic of a topic. Such a comparison can be performed in a same (or substantially similar) way to that discussed above and, therefore, a redundant discussion is not included.

The activity-based vectors from the user models 145 of the identified experts are aggregated in order to create an activity-based vector of the expertise model for that topic. As would be appreciated by one having ordinary skill in the art, different functions such as max, sum, etc., can be used for this aggregation.

An expertise assessment and learning recommendation module 155 is provided to determine, for an individual user or a population, the distance to targeted expertise, identify gaps in the knowledge, recommend learning activities, and identify certain users as emerging experts for a topic. The expertise assessment and learning recommendation module 155 may be integrated into the system as software, as a circuit, or as a combination thereof The expertise assessment and learning recommendation module 155 compares the user model 145 of the user with the expertise model 150 for the topic. The expertise assessment and learning recommendation module 155 uses a vector distance algorithm to calculate the similarity between the user's activities and the activities users identified as experts. The vector distance algorithm can be any of the known vector distance algorithms. As would be appreciated by one having ordinary skill in the art, different distance metrics can be used (e.g., Cosine similarity, Jensen-Shannon divergence, etc.).

The expertise assessment and learning recommendation module 155 calculates the distance 160 between the user's activity-based vector for the topic and the activity-based vector of the expertise model for that topic. This distance 160 can be used to determine the difference between the user's estimated knowledge of a topic and the estimated knowledge of the experts for that topic.

This distance can also be used to determine if a user has any gaps 165 in their knowledge of one or more topics. For example, if the distance between the user's activity-based vector and the activity-based vector of the expertise model is above a predetermined threshold for a topic, then the system will identify a gap in the user's knowledge.

Similarly, this distance can also be used to determine if a user has any gaps 165 in their knowledge of one or more sub-topics. For example, if the distance between the user's activity-based vector and the activity-based vector of the expertise model is greater than a predetermined threshold for a sub-topic, then the system will identify a gap in the user's knowledge for that sub-topic. This feature allows users to decrease the distance between their activity based vector and that of the expertise model more easily by allowing the user to focus on certain sub-topics for which they have an identified gap. Further, this feature also allows users to identify whether an expert of a topic has a gap in their knowledge of a sub-topic of that topic.

Based on the identified gap 165, the expertise assessment and learning recommendation module 155 can recommend learning activities 170 to the user so that the user may reduce or close the gaps in their knowledge for specific topics. For example, the expertise assessment and learning recommendation module 155 can recommend that the user read content relevant to those topics, identify other users not having the same gap or gaps in their knowledge, suggest other activities based on the activities of topic experts or users not having the same gap or gaps as the user. By identifying other users who do not have the same gap or gaps in their knowledge as the user, the expertise assessment and learning recommendation module 155 is able to recommend a more knowledgeable user who may be able to answer any questions that the user may have regarding the topic or sub-topic thereof.

That is, the expertise assessment and learning recommendation module 155 recommends activities to help facilitate users in getting closer to their target expertise level. The candidate activities may include the activities of the identified experts for the topic, or new activities related to the content associated with the activities of these experts. The expertise assessment and learning recommendation module 155 ranks candidate activities using a metric that measures the expected return on investment, which is calculated based on the expected change in the difference between the user's current level of expertise and the user's target level of expertise, the popularity and importance of the associated content, if any, the similarity or dissimilarity of the candidate activity with the existing activities of the user, and the estimated cost of performing the candidate activity (e.g. based on its content size/length). As a result, the expertise assessment and learning recommendation module 155 is able to dynamically recommend learning activities 170 (e.g., materials and tasks) based on a plurality of factors.

Further, by recommending learning activities 170, the exemplary embodiments of the present disclosure are able to provide a learning path to raising expertise that is highly customizable and able to suit the needs and interests of each of the particular users. Moreover, the recommended learning activities direct the user to refined portion of the available content thereby helping users more easily reach their target level of expertise.

For example, since the expertise assessment and learning recommendation module 155 compares the user's activities with the activities of the experts, it is able to recommend content and learning activities 170 to the user, which are the same or similar to those of one or more of the experts. Therefore, a user is able to follow the path of the experts of a topic. As a result, when compared to conventional technologies, this feature allows for a faster acceleration of expertise of the user.

Since the expertise assessment and learning recommendation module 155 compares, for example, any one or more of the following, what the user has read with what the experts have read, what the user has written with what the experts have written, whom the user cites with whom the experts cite, etc., it is able to provide a highly customizable learning path that is able to suit the needs and interests of each particular user.

The expertise assessment and learning recommendation module 155 is able to identify certain users as emerging experts 175 for a topic. If, for example, a user who was not manually or dynamically identified as an expert 135 (as described above) is determined to have a sufficiently small distance (e.g., less than or equal to a predetermined threshold) between their user model 145 and the expertise model 150 for a topic, then the expertise assessment and learning recommendation module 155 may dynamically identify the user as an emerging expert 175 for the topic. If a user is identified as an emerging expert, then in some exemplary embodiments, the global expertise model 150 for that topic is updated to include the user model 145 of the emerging expert.

Further, the expertise assessment and learning recommendation module 155 is able to identify certain users as experts of a sub-topic. That is, even if a user is not an expert of a topic, the user may be an expert of a certain sub-topic within that topic. This feature may be particularly useful for identifying experts of esoteric type sub-topics or for identifying who are knowledgeable about specialized sub-topics within a more general topic. In addition, this feature may allow an enterprise to assemble a team of users that are best able to address a specialized issue or to explain a sub-topic to a user having a particular gap in their knowledge of a topic.

In some embodiments of the present invention, the topics that are detected (sometimes automatically) are used as topics for learning, however, if there are one or more key (certain or specific) skills that are desired to be increased, a mapping can be done between the skill and the derived topic or topics. This feature may be particularly useful on an enterprise-level for identifying users with knowledge indicating they have the key skill, as well as identifying content that is directed toward the mapped topic (or sub-topic thereof).

In some exemplary embodiments, the comparison between the user model 145 and the expertise model 150 can also be applied to aggregated populations. This feature identifies gaps in expertise across the population. It also identifies emerging experts within the population. This feature may be particularly useful in supporting enterprise-level applications. For example, if a team of users has a gap in their expertise, then the population can be analyzed to determine whether some other user has the requisite expertise. If so, then that user can fill in the gap of knowledge while the team is learning that topic. This feature supports just-in-time expertise sharing.

In some exemplary embodiments, if the number of users having an identified gap 165 in a particular expertise is greater than (or equal to) a predetermined threshold, then the system will identify a gap in the expertise level within an enterprise.

Similarly, in some exemplary embodiments, based on the comparison of the user model 145 of a particular user and the expertise model 150 for a particular topic, the progress of a particular user can be tracked. For example, if the comparison at a first point in time shows that the distance between the user and the targeted expertise is X and the comparison at a second point in time shows that the distance between the user and the targeted expertise is Y, then the relationship between X and Y can be used to determine the user's progress from the first point in time to the second point in time.

Figure 3:
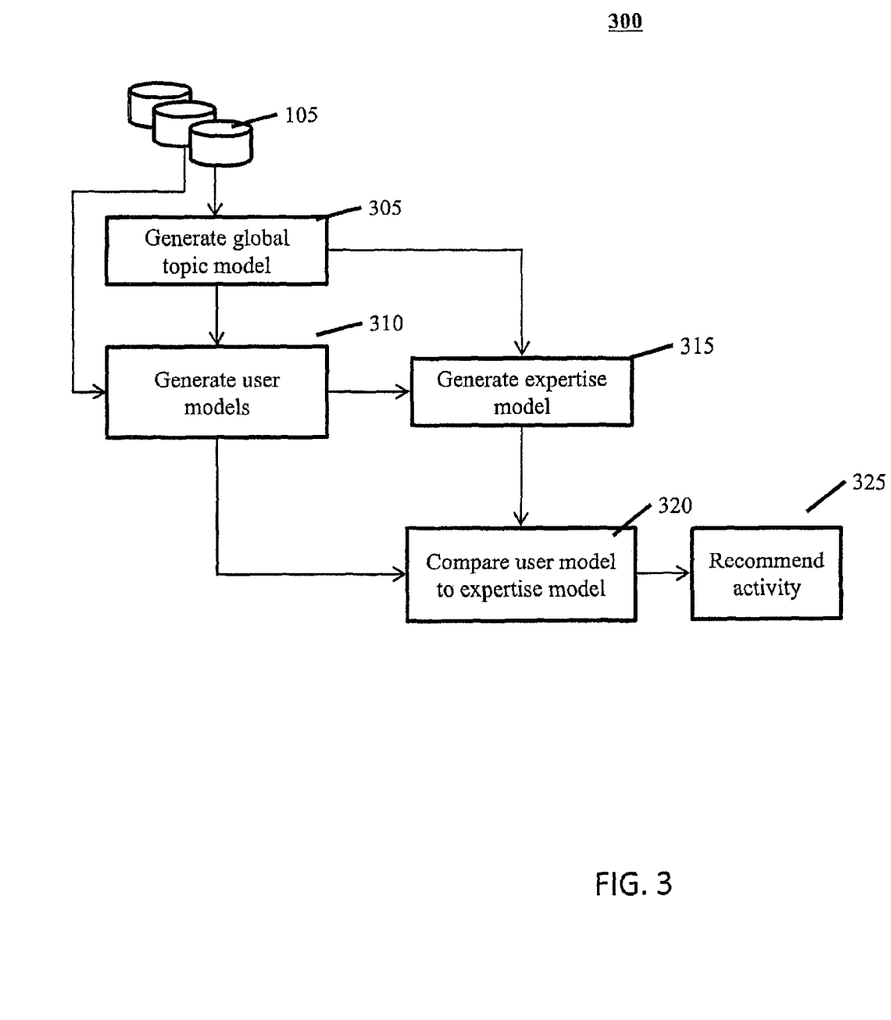
FIG. 3 depicts a block diagram for recommending an activity to a user.
Figure 4:
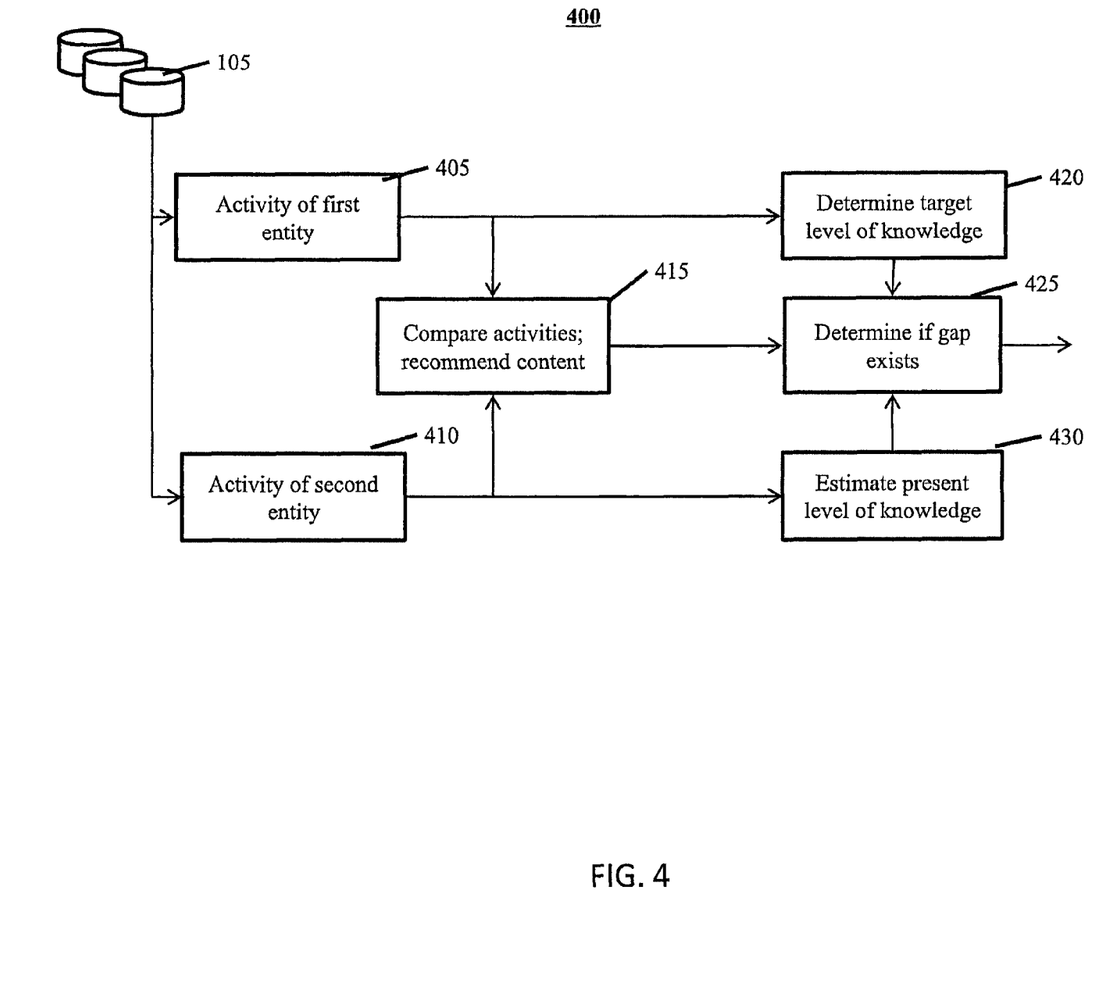
FIG. 4 depicts an exemplary block diagram for determining if a gap exists in a level of knowledge of an entity.
Figure 5:
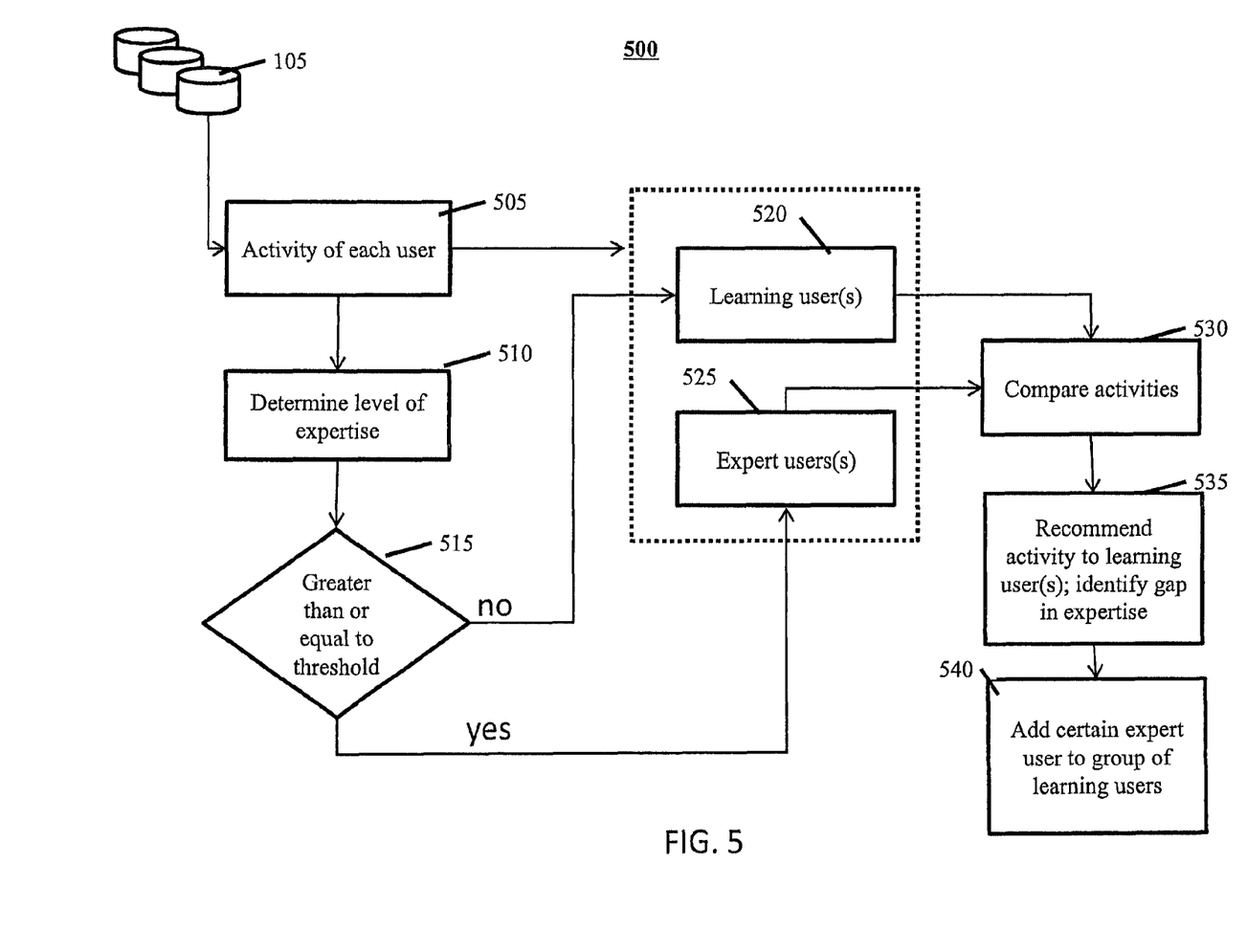
FIG. 5 depicts an exemplary block diagram for recommending an activity to a user, identifying if a gap exists in a level of knowledge of a user, and identifying an expert to address the gap.

FIGS. 3-5 show exemplary block diagrams of the exemplary embodiments discussed above. One having ordinary skill in the art would understand that the block diagrams shown in FIGS. 3-5 can be readily combined where appropriate. Further the features shown in FIGS. 3-5 can be embodied by software including one or more programs or software modules, one or more circuits, or any combination thereof.

FIG. 3 shows a block diagram 300 of some of the exemplary embodiments of the present disclosure. At 305, a global topic model 120 is generated based on the source data 105. At 310, user models 145 are each generated based on a respective user's activity associated with the source data 105 and the global topic model 120. At 315, the expertise model 150 is generated. At 320, one or more user models 145 are compared with the expertise model 150. At 325, an activity is recommended to a user based on the comparison at 320 in order to increase the knowledge of the user for a certain topic. Each activity can include one or more activities.

FIG. 4 shows a block diagram 400 of some of the exemplary embodiments of the present disclosure. At 405, an activity of a first entity is determined based on the source data 105. As used herein an "entity" may include, for example, one or more of a person, a university, a company, an organization, any combination thereof, etc. An entity may also be referred to herein as a "user".

At 410, an activity of a second entity is determined based on the source data 105. Each of the first and second entity can include one or more entities. The activities are compared at 415 and can each include one or more activities. Based on the activity of the first entity a target level of knowledge for a topic (and/or sub-topic(s)) is determined at 420. Based on the activity of the second entity a present level of knowledge for a topic (and/or sub-topic(s)) is estimated at 430. At 425, a determination of whether a gap exists between the present level of knowledge estimated at 430 and the target level of knowledge determined at 420 can be made according to the comparison of the activities calculated at 415.

As explained above, certain activities can be recommended based on the gap in knowledge. These certain activities can be based on the activities of more knowledgeable entities and can be expected to expedite the learning of the entity having the gap in their expertise.

Moreover, in a group situation in which one or more of the entities of a group have a calculated gap in their expertise, one or more entities not having the aforementioned gap in the expertise can be added to the group in order to provide a more well rounded group. Similarly, the other entities can simply be put in contact with the entities having the gap in order to answer any questions that may arise regarding topics where the gap is present.

FIG. 5 shows some exemplary embodiments of the present disclosure. At 505, each user's activities are analyzed in order to determine whether one or more of those activities are associated with the source data 105 (or certain content thereof). If a user is determined to have engaged in the activity, the content of the source data to which that activity is associated is determined. Based on this determination, a level of expertise of each user is determined for each topic and sub-topic thereof of the content of the source data 105. As new content of the source data is added, these levels of expertise are recalculated.

As a result it is possible to continually ascertain a user's level of expertise over a broad range of areas. This allows users (and enterprises) to continually stay abreast of changing market conditions.

At 515, a determination of whether a user's level of expertise is greater than or equal to a predetermined threshold is made. If the level of expertise is not at this level, then the user may be classified as a learning user (or a non-expert). If the level of expertise is at or above this level, then a user may be classified as an expert user.

A learning user for one topic may be considered to be an expert user for another topic. Similarly, a learning user for one sub-topic of a topic can be considered to be an expert user for another sub-topic of that same topic. Moreover, users may be manually reclassified at the discretion of an administration of the system.

For each topic (and sub-topic thereof) a user is classified as either a learning user at 520 or an expert user at 525. The activities of the respective users are stored relative to the content of each topic (and sub-topic thereof).

At 530 the activities of one or more learning users for a particular topic (and/or sub-topic thereof) are compared with the activities of one or more the expert users for the particular topic (and/or sub-topic thereof). Based on this comparison, at 535, certain learning activities expected to increase the level of expertise of a learning user can be recommended. Also at 535, gaps in the expertise of the learning user(s) can be identified based on the comparison.

At 540, it is shown that if a learning user (or group thereof) has a gap in their expertise, then the system can identify a user not having that particular gap in their expertise in order to establish a relationship that may close the gap in a group setting or facilitate an expedited increase in the level of knowledge for the leaning user(s) having the gap.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
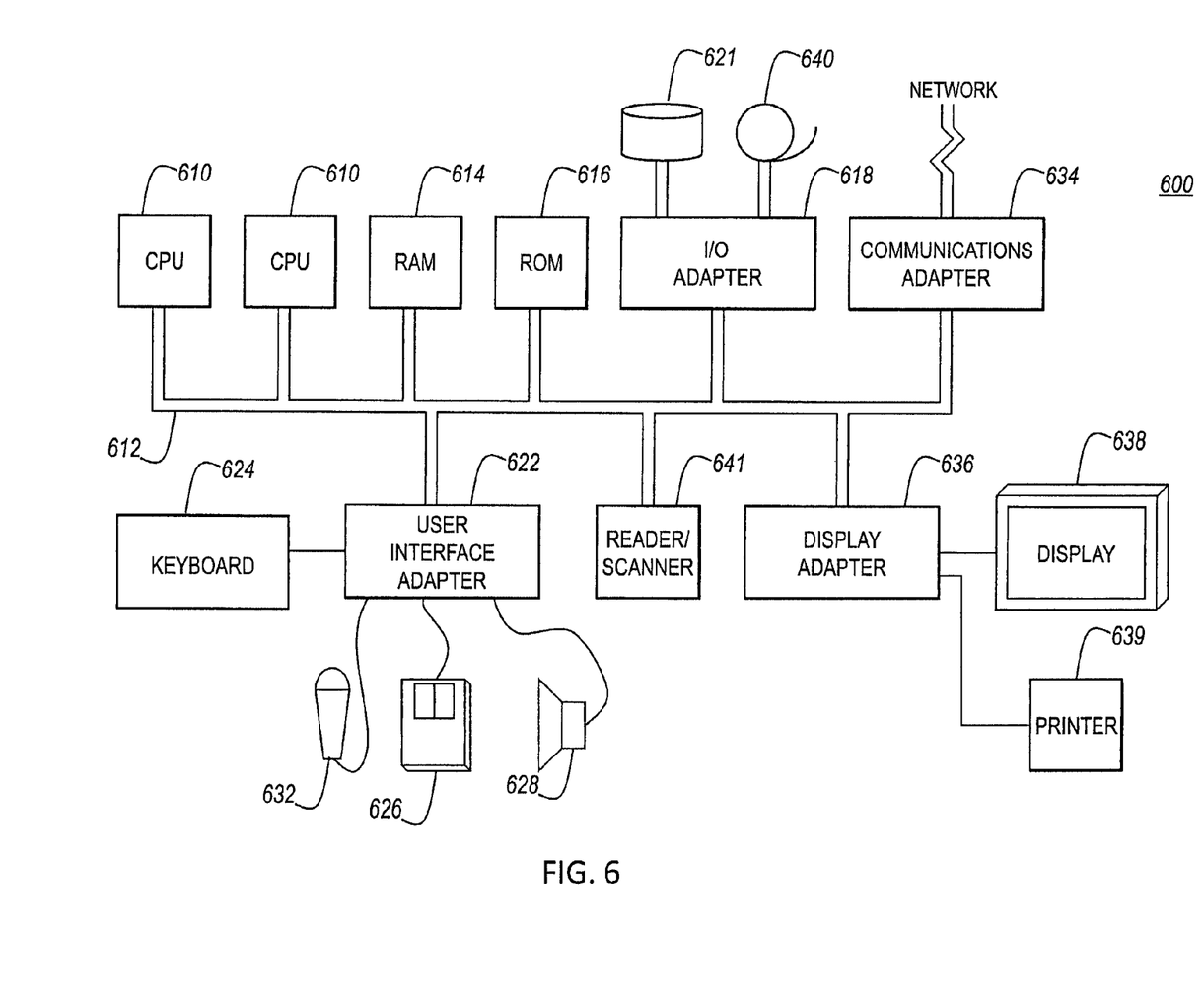
FIG. 6 depicts a typical hardware system, which may be used for implementing the inventive and novel aspects disclosed herein.

FIG. 6 illustrates a typical hardware configuration 600 which may be used for implementing the inventive cursor control system and method of controlling a cursor. The configuration has preferably at least one processor or central processing unit (CPU) 610. The CPUs 610 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639. Further, an automated reader/ scanner 641 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of storage media.

Thus, this aspect of the present invention is directed to a programmed product, including storage media tangibly embodying a program of machine-readable instructions executable by a digital data processor to perform the above method.

Such a method may be implemented, for example, by operating the CPU 610 to execute a sequence of machine-readable instructions. These instructions may reside in various types of storage media.

Thus, this aspect of the present invention is directed to a programmed product, including storage media tangibly embodying a program of machine-readable instructions executable by a digital data processor incorporating the CPU 610 and hardware above, to perform the method of the invention.

This storage media may include, for example, a RAM contained within the CPU 610, as represented by the fast-access storage for example. Alternatively, the instructions may be contained in another storage media, such as a magnetic data storage diskette 700 or compact disc 802 (FIG. 7), directly or indirectly accessible by the CPU 610.

Figure 7:
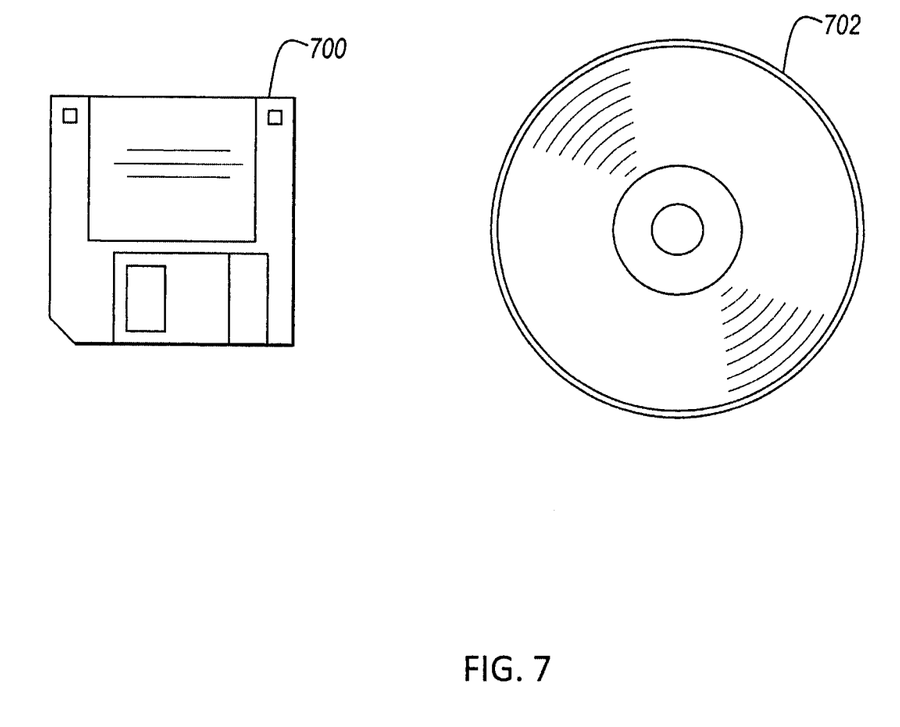
FIG. 7 depicts typical storage media, which may be used to store instructions for implementing the inventive and novel aspects disclosed herein.

Whether contained in the computer server/CPU 610, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable storage media. In an illustrative embodiment of the invention, the machine-readable instructions may comprise software object code, compiled from a language such as C, C++, etc.

According to the disclosure herein, one having ordinary skill in the art will readily appreciate that the present disclosure enables expertise ramp-up by supporting personalized exploratory learning, helping users understand the distance to their target level of expertise, a path to targeted expertise, and their progress in getting to the target. These exemplary features alone or in combination facilitate users in getting closer to their target with dynamic recommendations for learning materials and tasks, support just-in-time expertise sharing in the enterprise by surfacing groups of people for real-time communication/questions on a given topic, track the informal learning that user undertakes, provide a vetting system for evaluating emerging experts based on automated calculations, identify and rate emerging experts, identify gaps in expertise on certain topics and certain sub-topics included therein, identify emerging hot topics, and identify the content that cultivates interaction between experts (via monitoring of content consumed and created by the various users).

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A system, comprising:
   a user model module that generates a plurality of topic-specific user knowledge models for each user of a plurality of users, each topic-specific user knowledge model representing a level of knowledge possessed by a respective user on a single topic from a set of globally defined topics shared among the plurality of users;
   a expertise model building module that generates a plurality of topic-specific expert knowledge models, each topic-specific expert knowledge model representing an aggregate level of knowledge possessed by a plurality of expert users on a single topic from a set of globally defined topics shared among the plurality of users; and
   a processor of a computer that executes instructions for:
      comparing the topic-specific user knowledge model of the first user with the topic-specific expert knowledge model for a respective topic to determine a distance between a user knowledge level and an aggregate expert knowledge level for the topic, the comparing being performed by the processor on the computer;
      recommending an activity including at least one of reading, writing, downloading, watching, and commenting of a content item relevant to the topic to the first user based on said comparing;
      updating the topic-specific user knowledge model of the first user to reflect the first user's increased level of knowledge after the first user engages in the recommended activity for the topic; and
      adjusting the activity recommendation based on the updated topic-specific user knowledge model.

2. The system according to claim 1, wherein, in the recommending, the activity includes said reading, said writing, said downloading, said commenting, and said watching.

3. The system according to claim 1, wherein said each of the topic-specific user knowledge models comprises a topic-specific user activity vector, where each dimension of the vector represents the user's knowledge level as reflected in a certain type of a user's activities including said reading, said writing, said downloading, said watching, and said commenting of the respective user on the respective topic.

4. The system according to claim 3, wherein calculation of the topic-specific user activity vector comprises:
   combining a topic relevance, a popularity, and an importance of a content item associated with a single user activity of the respective user to calculate a topic-specific score of the activity.

5. The system according to claim 4, wherein said calculation of the topic-specific user activity vector further comprises:
   summing up the topic-specific scores of all user activities of the respective user that are of a certain activity type to determine a topic and type-specific score of a respective activity type for the respective user.

6. The system according to claim 5, wherein said calculation of the topic-specific user activity vector further comprises:
   applying a type-specific weight to the topic and type-specific score of the respective activity type to determine a value of a respective dimension in the user activity vector.

7. The system according to claim 1, wherein the topic-specific expert knowledge model comprises a topic-specific expert activity vector.

8. The system according to claim 7, wherein calculation of the expert activity vector comprises:
   selecting user activity vectors of the plurality of users who are determined as experts of the respective topic.

9. The system according to claim 8, wherein said calculation of the expert activity vector further comprises:
   aggregating values for a certain dimension of the selected user activity vectors to calculate a value of a respective dimension for an expert activity vector.

10. The system according to claim 9, wherein said aggregating comprises calculating summation, maximum, minimum, and mean values for the certain dimension.

11. The system according to claim 1, wherein the distance between the user knowledge level and the aggregate expert knowledge level for the single topic is calculated based on a vector distance of a topic-specific user activity vector and a topic-specific expert activity vector.

12. The system according to claim 1, wherein the recommended activity includes a certain type of activity to be performed on a content associated with activities of the expert users.

13. The system according to claim 12, wherein a ranking of the recommended activity is determined based on an expected return-on-investment value whose calculation comprises:
   an expected change in a user's current knowledge level if the user engages in the recommended activity;
   a popularity and an importance of an associated content;
   a similarity or a dissimilarity of the recommended activity with existing activities of the user; and
   an estimated cost of performing the recommended activity.

14. The system according to claim 1, wherein the updating of the topic-specific user knowledge model of the first user is dynamically performed after the first user engages in a recommended activity for the topic.

15. The system according to claim 14, wherein the updating comprises:
   combining a topic relevance, a popularity, and an importance of a content item associated with an accomplished recommended activity of the respective user to calculate a topic-specific score of the activity;
   applying a type-specific weight a the topic-specific score of an activity to determine a topic- and type-specific score of the activity; and
   adding the topic- and type-specific score of the activity to a respective dimension in a topic-specific user activity vector based on a type of the accomplished recommended activity.

* * * * *